United States Patent
Farnham et al.

(10) Patent No.: US 6,768,833 B2
(45) Date of Patent: Jul. 27, 2004

(54) OPTICAL COMMUNICATIONS SYSTEMS INCLUDING A BRANCHING UNIT AND ASSOCIATED DEVICES AND METHODS

(75) Inventors: Austin L. Farnham, Severna Park, MD (US); Michael S. Petersen, Columbia, MD (US); Bo Pedersen, Annapolis, MD (US)

(73) Assignee: Corvis Corporation, Columbia, MD (US)

( * ) Notice: Subject to any disclaimer, the term of this patent is extended or adjusted under 35 U.S.C. 154(b) by 55 days.

(21) Appl. No.: 10/236,146

(22) Filed: Sep. 6, 2002

(65) Prior Publication Data

US 2004/0047549 A1 Mar. 11, 2004

(51) Int. Cl.[7] .............................. G02B 6/28; H04B 10/00
(52) U.S. Cl. ............................. 385/24; 385/31; 385/42; 385/88; 385/89; 398/81; 398/157; 398/158; 398/160
(58) Field of Search ............................. 385/31, 39, 24, 385/48, 49, 42, 40, 41, 88, 89; 398/81, 157, 158, 160

(56) References Cited

U.S. PATENT DOCUMENTS

| | | | |
|---|---|---|---|
| 4,616,898 A | * 10/1986 | Hicks, Jr. ..................... 385/24 |
| 5,005,937 A | 4/1991 | Aida et al. ................. 385/24 X |
| 5,083,874 A | 1/1992 | Aida et al. ..................... 385/24 |
| 5,173,957 A | * 12/1992 | Bergano et al. ............... 385/24 |
| 5,185,814 A | * 2/1993 | Healey ......................... 385/24 |
| 5,214,312 A | 5/1993 | Inoue .......................... 307/43 |
| 5,233,463 A | * 8/1993 | Grasso et al. .......... 359/341.33 |
| 5,404,413 A | * 4/1995 | Delavaux et al. ............. 385/15 |
| 5,900,969 A | * 5/1999 | Srivastava et al. ..... 359/341.42 |
| 2004/0047549 A1 | * 3/2004 | Farnham et al. .............. 385/24 |

* cited by examiner

Primary Examiner—Brian M. Healy

(57) ABSTRACT

An optical communications system, including first terminal equipment, second terminal equipment, third terminal equipment, a first powered optical segment connected to the first terminal equipment and including at least one amplifier, a second powered optical segment connected to the second terminal equipment and including at least one amplifier, an unpowered optical segment connected to the third terminal equipment, and a branch unit connecting the first powered segment, the second powered segment, and the unpowered segment via passive, all-optical connections, and wherein the unpowered segment is pumped with optical energy through the branch unit from at least one of the amplifiers in the first and second powered segments.

17 Claims, 5 Drawing Sheets

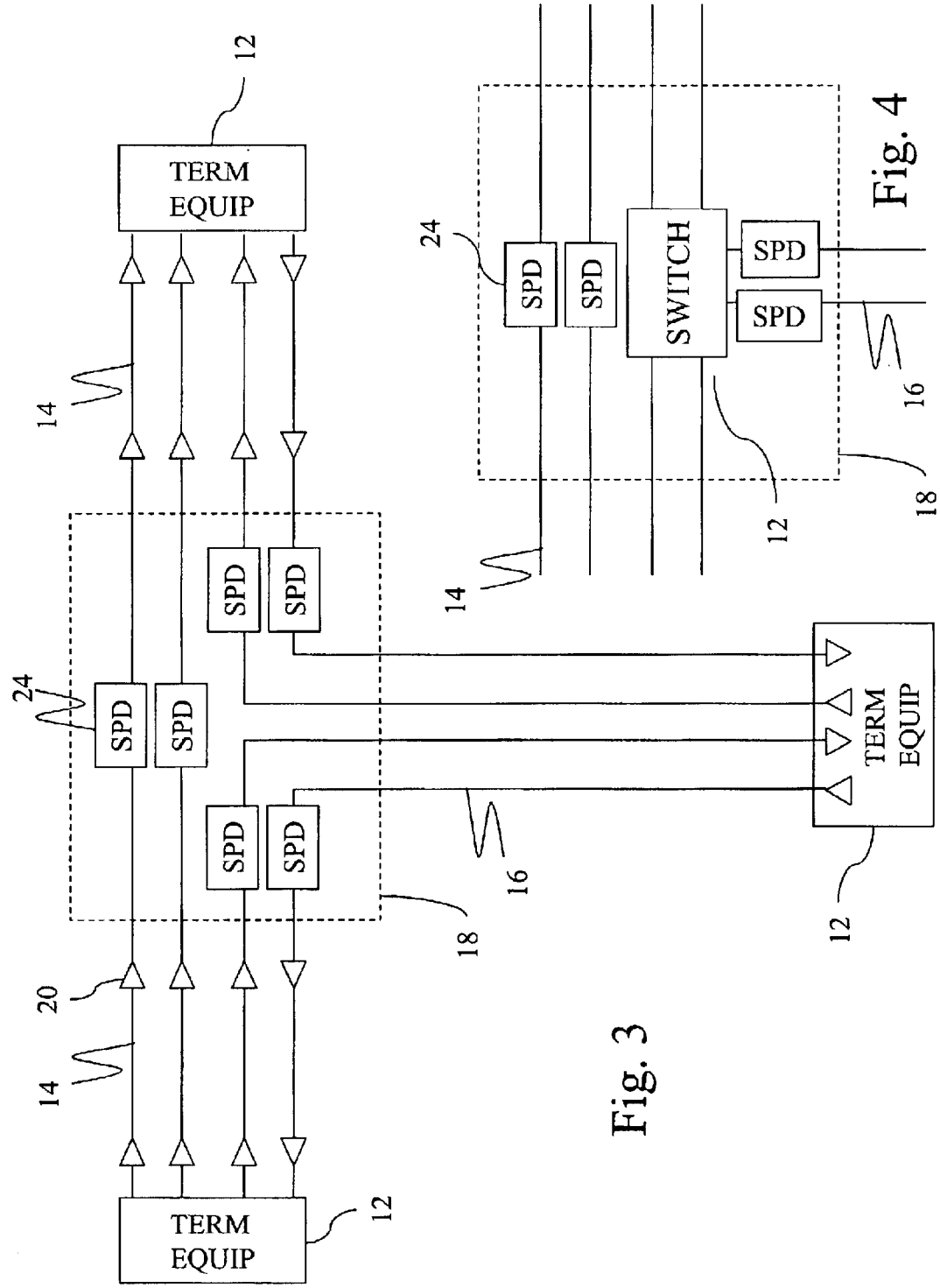

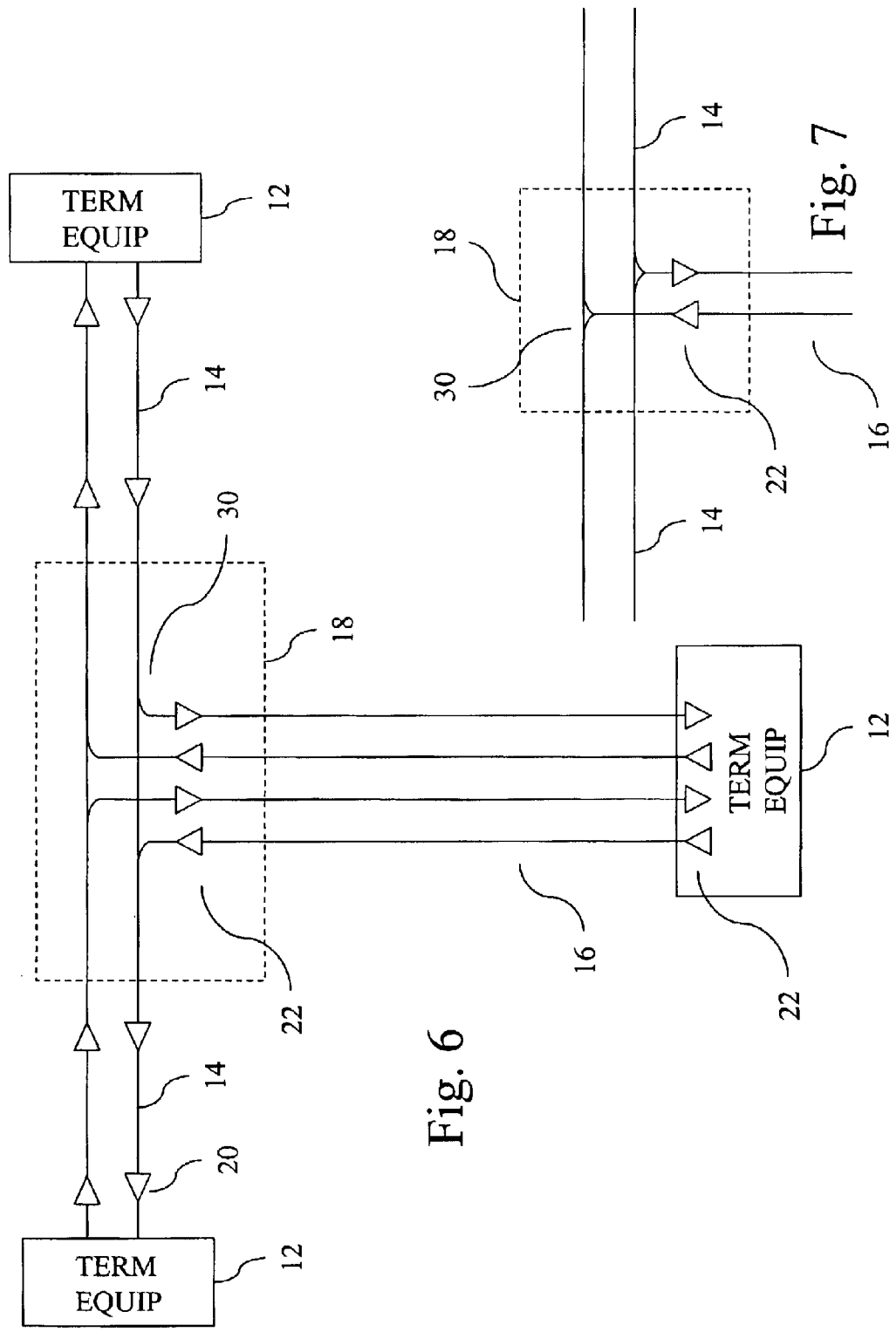

OPTICAL COMMUNICATIONS SYSTEMS INCLUDING A BRANCHING UNIT AND ASSOCIATED DEVICES AND METHODS

CROSS-REFERENCE TO RELATED APPLICATIONS

Not applicable.

STATEMENT REGARDING FEDERALLY-SPONSORED RESEARCH AND DEVELOPMENT

Not applicable.

BACKGROUND OF THE INVENTION

The present invention is directed generally to the transmission of signals in optical communications systems. More particularly, the invention relates to optical communications systems including a branching unit and to associated devices and methods.

It is known to construct optical communications systems with one or more branch units to allow for connections to three or more locations. See, for example, U.S. Pat. No. 5,005,937, issued Apr. 9, 1991, U.S. Pat. No. 5,083,874, issued Jan. 28, 1992, and U.S. Pat. No. 5,214,312, issued May 25, 1993. Occasionally, power in a communications system must be reconfigured, such as in response to a cable cut or other failures. Branch units, as well as other parts of the system, often include electronic equipment to facilitate the power reconfiguration. That equipment can add significant expense to the branch unit and to other parts of the system. While the power is being reconfigured, traffic is typically dropped and communication through the affected parts of the system is interrupted.

In addition, the branch units and other parts of the system often include optical and electrical equipment for switching, amplifying or otherwise controlling traffic flow through the system. This equipment can be expensive and can add complexity to the system. Expense and complexity are typically undesired, particularly if the expense and complexity is for a relatively short segment between the branch unit and terminal equipment.

Accordingly, there is need for communications systems with branch units that allow for improved performance and lower cost.

SUMMARY OF THE INVENTION

The systems, devices, and methods of the present invention address the above-stated needs. The present invention is generally described in terms of undersea systems, although it is also applicable to other systems, such as terrestrial communications systems.

One embodiment of an optical communications system according to the present invention includes first terminal equipment, second terminal equipment, third terminal equipment, a first powered optical segment connected to the first terminal equipment and including at least one amplifier, a second powered optical segment connected to the second terminal equipment and including at least one amplifier, an unpowered optical segment connected to the third terminal equipment, and a branch unit connecting the first powered segment, the second powered segment, and the unpowered segment via passive, all-optical connections, and wherein the unpowered segment is pumped with optical energy through the branch unit from at least one of the amplifiers in the first and second powered segments.

Another embodiment of an optical communications system according to the present invention includes first terminal equipment, second terminal equipment, third terminal equipment, a first powered optical segment connected to the first terminal equipment and including at least one amplifier, a second powered optical segment connected to the second terminal equipment and including at least one amplifier, an unpowered optical segment connected to the third terminal equipment, and a branch unit connecting the first powered segment, the second powered segment, and the unpowered segment via passive, all-optical connections, and wherein the first powered segment and the unpowered segment are connected via an optical connection that is not connected to the second powered segment.

One embodiment of a method of transmitting optical communications signals according to the present invention includes transmitting first and second optical communications signals from first terminal equipment along a first powered segment, amplifying each of the first and second signals at least one time in the first powered segment, attenuating the first signal after the first powered segment, directing the first signal to a second powered segment, amplifying the first signal at least one time in the second powered segment, receiving the first signal at second terminal equipment, amplifying the second signal after the first powered segment, directing the second signal to an unpowered segment, and receiving the second signal at third terminal equipment.

These and other embodiments of the present invention will be described in the following detailed description. The present invention addresses the needs described above in the description of the background of the invention by providing improved systems, apparatuses, and methods. These advantages and others will become apparent from the following detailed description.

BRIEF DESCRIPTION OF THE DRAWINGS

Embodiments of the present invention will now be described, by way of example only, with reference to the accompanying drawings, wherein:

FIG. 3 illustrates a system and one embodiment of a branch unit;

FIG. 4 illustrates one embodiment of a branch unit including a switch;

FIG. 6 illustrates another embodiment of the branch unit including splitters; and FIG. 7 illustrates another embodiment of the branch unit including splitters.

DETAILED DESCRIPTION OF THE INVENTION

The present invention will generally be described in terms of an undersea communications system 10, although advantages of the present invention may be realized in other systems, such as terrestrial communications systems. For example, the system 10 may include add/drop devices, additional terminal equipment, or other equipment along the segments of the system, as is often found in terrestrial systems. Furthermore, although the present invention will be described in terms of a system in which power is transmitted along the segments to where it is needed, as is typical in undersea systems, power may also be provided locally or via other paths to where it is needed.

Figure 1:
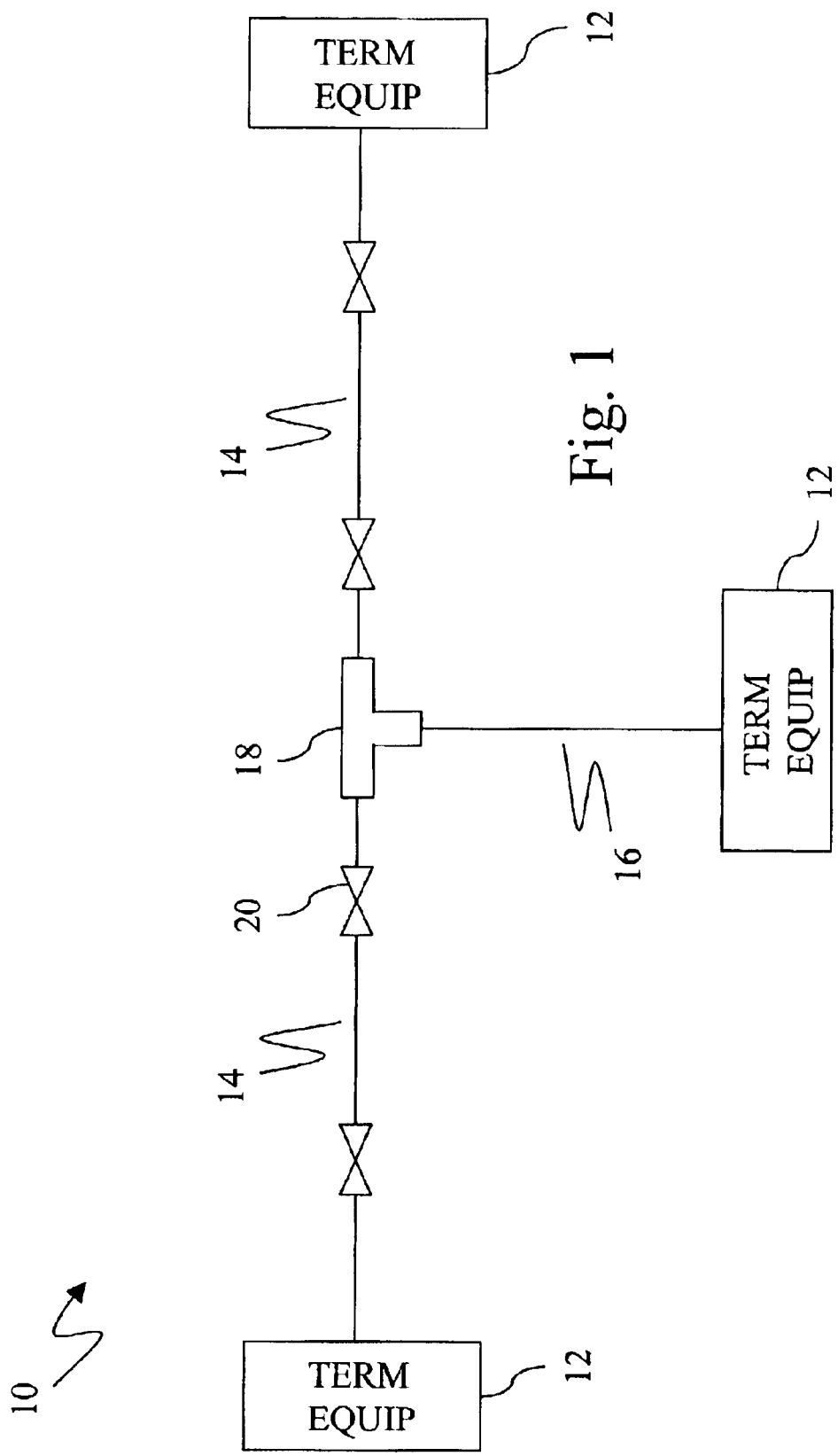
FIG. 1 illustrates an embodiment of an optical undersea communications systems.

FIG. 1 illustrates one embodiment of an optical undersea communications system 10 according to the present invention. The system 10 includes terminal equipment 12, two powered segments 14, an unpowered segment 16, and a branch unit 18. In the illustrated embodiment, there are two powered segments 14 which include amplifiers 20, and one unpowered segment 16 which does not include amplifiers 20, although other types and combinations of segments are also possible. Advantages of the present invention may be realized with different numbers, orientations, and location, of branch units 18, segments 14, 16, terminal equipment 12, and amplifiers 20.

The terminal equipment 12 is typically located on land and often acts as an interface between systems. The terminal equipment 12 typically includes at least one transmitter or receiver and may also be used to perform signal processing, such as repeating, remodulating, regenerating, switching, adding, dropping, aggregating, or other processing of signals. The terminal equipment 12 may also provide power to the system 10. For example, the terminal equipment 12 may provide constant current sources, constant voltage sources, or other forms of power. The terminal equipment 12 may operate with reference to floating or fixed electrical ground, such as ocean ground. Furthermore, the terminal equipment may be dynamic to accommodate variations in the system, such as changing electrical ground.

The branch unit 18 connects several segments 14, 16 together. In the illustrated embodiment, a three port branch unit 18 connects three segments 14, 16 together, although systems 10 having other combinations of segments 14, 16, branch units 18, and branch unit ports may also be used.

The amplifiers 20 may be, for example, rare-earth doped amplifiers, Raman amplifiers, lumped amplifiers, distributed amplifiers, other amplifier types, or combinations of amplifier types and may be configured, for example, in one or more parallel or serial stages. The number, type, and spacing of amplifiers 20 varies depending on the particular application and desired performance. In one embodiment, amplifiers 20 in the powered segments 14 are used to provide additional amplification for signals traveling through the unpowered segment 16. In particular, the adjacent amplifiers 20 may produce optical pump power used, for example, in the branch unit 18 or in the unpowered segment 16 to amplify signals to, from, or in the unpowered segment 16. For example, pump power from amplifiers 20 adjacent to the branch unit 18 may be used to amplify signals in the branch unit 18 or in the unpowered segment 16. In those embodiments, it may be desirable to locate the adjacent amplifiers 20 closer to the branch unit 18 than would normally be done, so as to increase the amplifying effect for the unpowered segment 16. For example, in some embodiments the adjacent amplifiers 20 and branch unit 18 may be placed as close together as practical (e.g., 10 kilometers) or collocated with the branch unit 18. If amplifiers or pumps are located in the branch unit 18, close placement of the adjacent amplifiers 20 may not be needed. In addition, amplifier pumps 22 may be provided at the terminal equipment 12 of the unpowered segment 16 to provide distributed amplification of signals in the unpowered segment 16 and/or to provide lumped amplification.

The segments 14, 16 provide a path for optical signals in the system 10. In one embodiment, two of the segments 14 are powered and include one or more amplifiers 20 in the segments. The third segment 16 is unpowered, although signals in the unpowered segment 16 may be amplified or otherwise processed as described hereinbelow. Unpowered segments 16 are typically less expensive than powered segments 14, so there is often a cost advantage to systems which can operate with one or more unpowered segments 16. The present invention is generally described in terms of two powered segments 14 and one unpowered segment 16, although different numbers and combinations of powered and unpowered segments 16 may realize benefits of the present invention. Furthermore, the unpowered segment 16 may be completely unpowered, or it may only be partially unpowered if, for example, a completely unpowered segment 16 does not offer the desired performance. For example, a partially unpowered segment 16 may be connected to a convenient source of power, such as a branch unit 18 or terminal equipment 12, and include one or more amplifiers, pumps, or other equipment along a portion of the segment. Such a partially unpowered segment 16 can offer a compromise between performance and cost. Completely unpowered segments 16 may also include signal processing or other equipment, such as unpowered or passive optical components, or other equipment which may be powered from the branch unit 18 or the powered segments 14.

Figure 2:
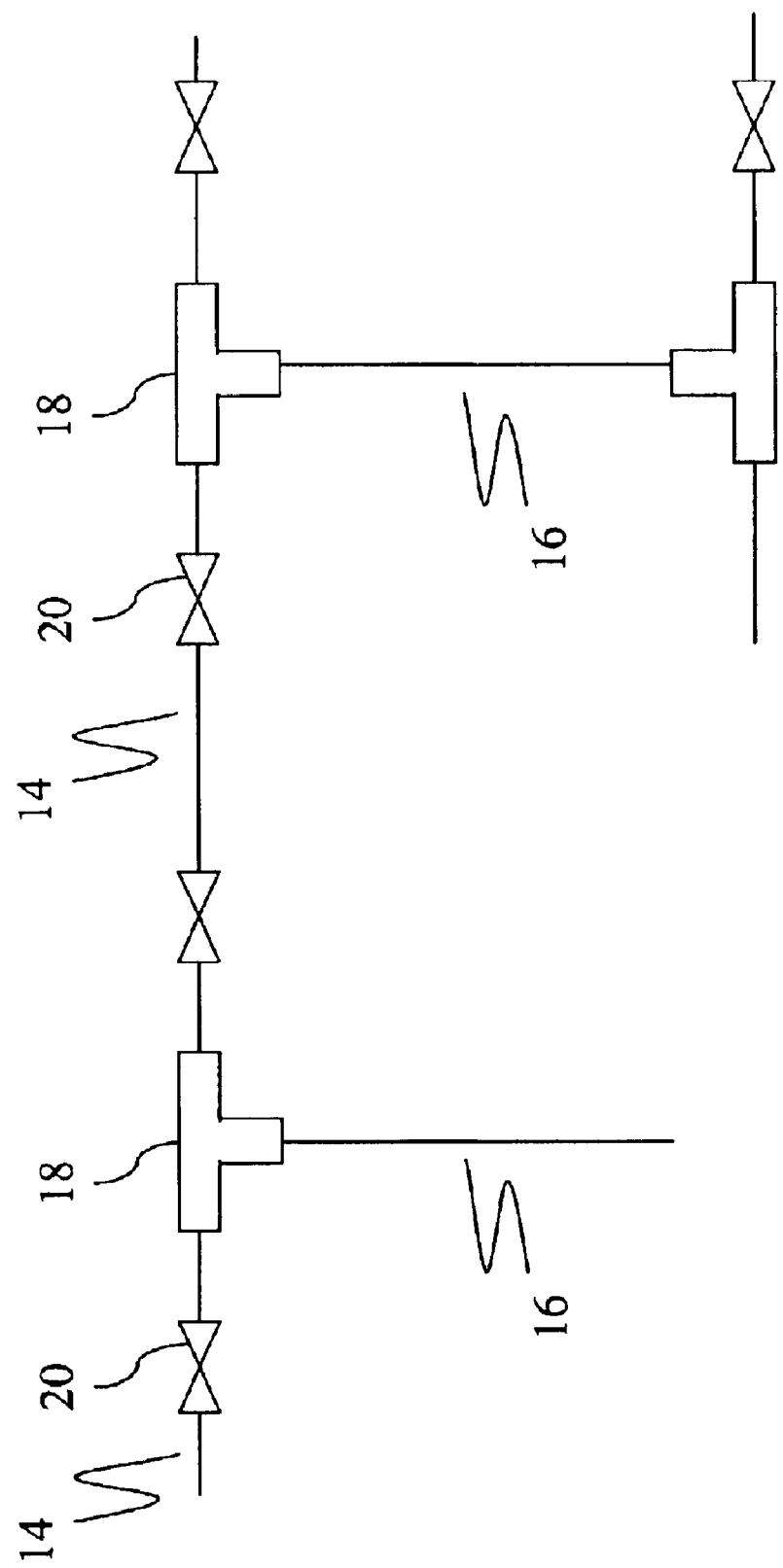
FIG. 2 illustrates a portion of another embodiment of an undersea communications system.

FIG. 2 illustrates a portion of another embodiment of a system 10 in which several branch units 18 are utilized. The number, locations, and orientation of branch units 18 and the manner in which they interconnect segments 14, 16 may be varied.

FIG. 3 illustrates a system 10 and one embodiment of a branch unit 18 according to the present invention. The branch unit 18 is shown to include signal processing devices 24 between the powered segments 14 and between each of the powered segments 14 and the unpowered segment 16. The signal processing devices 24 may take various forms, such as doped, undoped, or specialty fiber, or other devices, such as active or passive optical or electrical processing devices. The signal processing devices 24 may be all-optical or optical-electrical-optical devices.

The signal processing devices 24 may be used for amplification, attenuation, or other signal processing. For example, the signal processing devices 24 between the powered and unpowered segments 16 may be used as amplifiers or for other functions, such as dispersion compensation. The signal processing devices 24 may be doped with Erbium or other rare Earth elements to provide attenuation or amplification of optical signals when pumped, such as from the adjacent amplifiers 20 in the powered segments 14 or from pumps in the branch unit 18. The signal processing devices 24 may take other forms as well, such as dispersion compensating fiber or other fiber which may be used to provide for Raman amplification of the optical signals to and from the unpowered segment 16, as well as other signal processing. Other variations are also possible, such as eliminating the signal processing devices 24 if amplification or other signal processing is not necessary, or providing other amplification, such as distributed amplification using the unpowered segment 16 as the amplifying medium (e.g., distributed Raman amplification or distributed doped fiber amplification). Other types of fiber or signal processing devices 24 may also be used.

The signal processing devices 24 between the powered segments 14 may be used to compensate for the close proximity of the adjacent amplifiers 20 in the powered segments 14 and to allow for proper operation of the system 10, such as by attenuating the optical signals to prevent non-linear effects. In other embodiments of the invention, the signal processing devices 24 may be eliminated, such as if the adjacent amplifiers 20 in the powered segments 14 are spaced farther from the branching unit. Other types of signal processing devices 24 may also be used.

The branch unit 18 is illustrated as a passive optical, unit which provides for improved performance and lower cost branch units 18 and optical systems. The branch unit 18 is also shown as having dedicated connections between the terminal equipment 12. In other words, the connection between the powered segments 14 is not shared with the unpowered segment 16, and the connections between the unpowered segment 16 and one of the powered segments 14 is not shared with the other powered segment. Alternatively, the branch unit 18 may include shared connections or active components, such as multiple connections between segments and active signal processing devices 24, such as switches, amplifiers, and other active optical and electrical devices.

The branch unit 18 is shown as having three ports and the system 10 has three fiber pairs connecting each terminal equipment 12 with each other terminal equipment 12 through the branch unit 18. The branch unit 18 may have more than three ports, and the system 10 may have more or less than three fiber pairs and may, for example, utilize bi-directional signals over a common fiber as well as uni-directional fiber pairs. In undersea applications, the submerged cable often has multiple fiber pairs (e.g., four, eight, or twelve pairs), and the branch unit 18 would sized appropriately.

The use of one or more unpowered segments 16 also provides improved performance because, if the unpowered segment 16 is cut, power and ground do not need to be reconfigured. In other words, because the unpowered segment 16 did not provide or consume power to or from the branching unit or the powered segments 14, power reconfiguration is not needed.

FIG. 4 illustrates another embodiment of the present invention in which the branch unit 18 includes a switch 26. The switch 26 may be used to add or drop traffic between the powered and unpowered segments 16. The switch 26 may be an all-optical device or an optical-electrical-optical device. The switch 26 may also perform other signal processing operations, such as amplification, grooming, etc. In addition, the switch 26 may be connected to all of the fibers entering the branch unit 18, or it may be connected to only some of the fibers (as shown in FIG. 4), thereby allowing some traffic to bypass the switch 26. Alternatively, other devices may be included in the branch unit 18 in place of or in addition to the switch 26.

Figure 5:
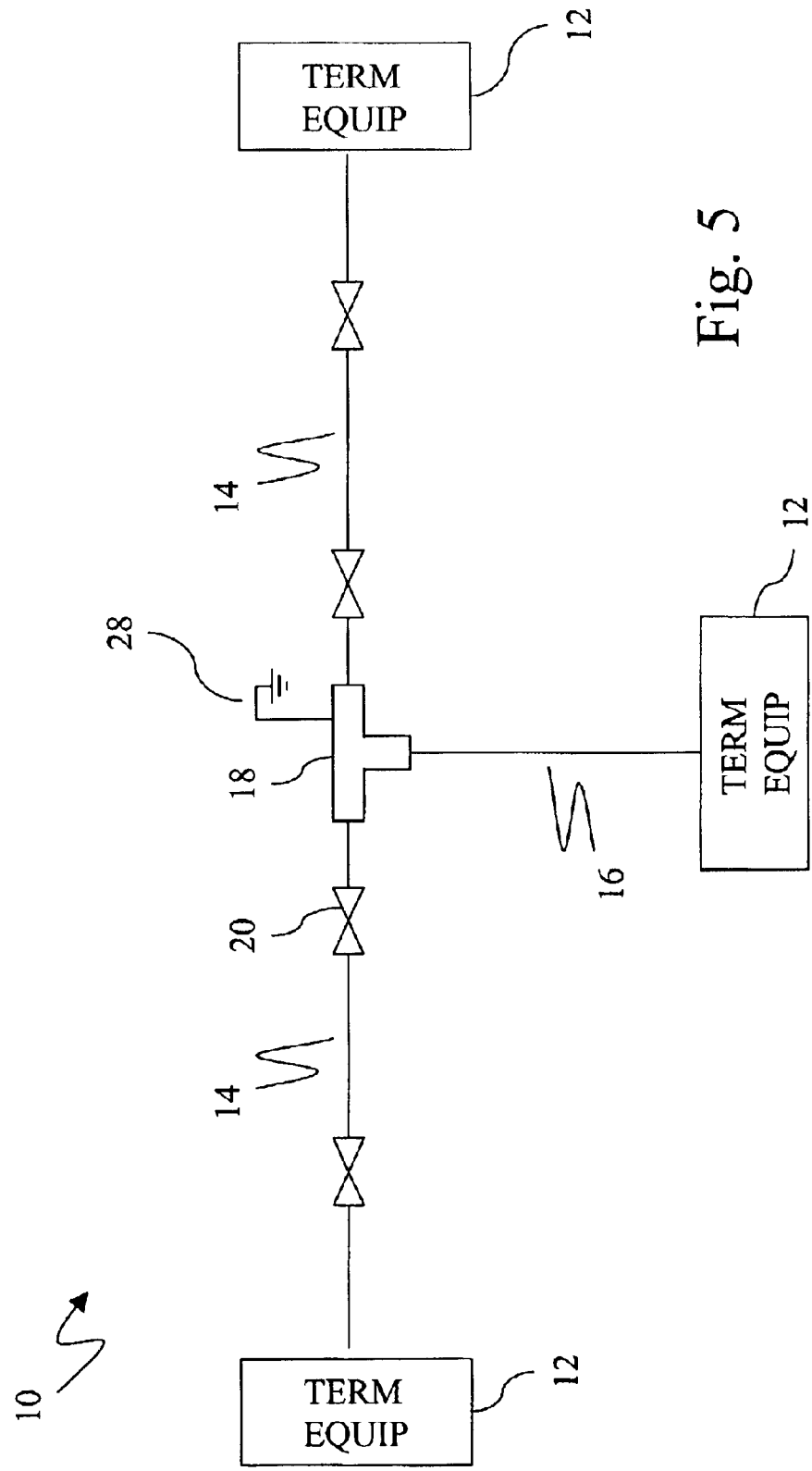
FIG. 5 illustrates another embodiment of the communications system in which the branch unit provides a fixed electrical ground for the system.

FIG. 5 illustrates another embodiment of the communications system 10 in which the branch unit 18 provides a fixed electrical ground 28 for the system 10. In other embodiments, the system 10 may utilize other power architectures, such as floating ground or virtual ground. In the system 10 illustrated in FIG. 5, the branch unit 18 forms a connection to ground (e.g., ocean ground) which is fixed and does not float in the event of a cable cut or other interruption to electrical power in the system 10. That embodiment offers improved system performance and response in the event of power interruption. For example, if the system 10 includes two powered segments 14 and one unpowered segment 16, as described hereinabove, and if one of the powered segments 14 is cut, there is no need to reconfigure the power and ground of the system 10. In other words, the ground at the branch unit 18 does not need to be reconfigured, nor does the voltage along the uncut, powered segment.

In another embodiment, ground may be provided to the branch unit 18 or other equipment from the terminal equipment 12 for one of the segments 14, 16. For example, unpowered segments often include an electrical conductor even though the segment is not powered. This conductor may be used to connect ground from the terminal equipment 12 to the branch unit 18 or to other equipment which needs electrical ground. The unpowered segment 16 may be particularly well suited for conveying ground because, typically, the unpowered segment 16 is a relatively short segment.

FIG. 6 illustrates another embodiment of the invention in which splitters 30 are used to send optical signals from one of the powered segments 14 to both the unpowered segment 16 and the other powered segment 14. In another embodiment, a signal from the unpowered segment 16 is split to both of the powered segments 14. In another embodiment, splitters 30 may be used to split signals from each segment to each of the other segments, as illustrated in FIG. 7.

Also in the embodiment of FIG. 6, the branch unit 18 includes amplifiers or pumps 22 for the unpowered segment 16. As a result, the adjacent amplifiers 20 in the powered segments 14 are not used to amplify signals in the unpowered segment 16, so that the branch unit 18 and the adjacent amplifiers 20 are not spaced closer than normal, thereby allowing for the elimination of additional fiber or other signal processing devices 24 that might otherwise be needed to allow for normal operation of the system 10. In another embodiment, the system 10 may utilize pumps 22 in both the branch unit 18 and the adjacent amplifiers 20 to provide amplification for the unpowered segment 16.

Many variations and modifications can be made to described embodiments of the invention without departing from the scope of the invention. For example, although the present invention has been described in the context of an undersea communications system, advantages of the present invention may be realized in other systems, such as terrestrial systems. Other variations, modifications, and combinations are taught and suggested by the present invention, and it is intended that the foregoing specification and the following claims cover such variations, modifications, and combinations.

What is claimed is:

1. An optical communications system, comprising:
   first terminal equipment;
   second terminal equipment;
   third terminal equipment;
   a first powered optical segment connected to the first terminal equipment and including at least one amplifier;
   a second powered optical segment connected to the second terminal equipment and including at least one amplifier;
   an unpowered optical segment connected to the third terminal equipment; and
   a branch unit connecting the first powered segment, the second powered segment, and the unpowered segment via passive, all-optical connections, and wherein the unpowered segment is pumped with optical energy through the branch unit front at least one of the amplifiers in the first and second powered segments, and wherein the branch unit provides a fixed electrical ground for the system.

2. The system of claim 1, wherein the branch unit provides a fixed electrical ground which is ocean ground.

3. The system of claim 1, wherein the system includes at least one additional branch unit.

4. The system of claim 3, wherein the system includes at least one additional unpowered segment connected to one of the branch unit and the at least one additional branch unit.

5. The system of claim 1, wherein the first powered segment and the unpowered segment are connected via an optical connection that is not connected to the second powered segment.

6. The system of claim 1, wherein the unpowered segment includes a distributed amplifier fiber portion which is pumped with the optical energy from at least one of the amplifiers in the first and second powered segments.

7. The system of claim 1, wherein the branch unit includes a pumped amplifier fiber portion which is pumped with the optical energy from at least one of the amplifiers in the first and second powered segments.

8. The system of claim 1, wherein the unpowered segment is pumped with optical energy from the third terminal equipment.

9. An optical communications system, comprising:
   first terminal equipment;
   second terminal equipment;
   third terminal equipment;
   a first powered optical segment connected to the first terminal equipment and including at least one amplifier;
   a second powered optical segment connected to the second terminal equipment and including at least one amplifier;
   an unpowered optical segment connected to the third terminal equipment; and
   a branch unit connecting the first powered segment, the second powered segment, and the unpowered segment via passive, all-optical connections, and wherein the unpowered segment is pumped with optical energy through the branch unit from at least one of the amplifiers in the first and second powered segments, and wherein the branch unit includes an attenuator connected between the first and second powered segments.

10. The system of claim 9, wherein the attenuator between the first and second powered segments is dispersion compensation fiber.

11. An optical communications system, comprising:
    first terminal equipment;
    second terminal equipment;
    third terminal equipment;
    a first powered optical segment connected to the first terminal equipment and including at least one amplifier;
    a second powered optical segment connected to the second terminal equipment and including at least one amplifier;
    an unpowered optical segment connected to the third terminal equipment; and
    a branch unit connecting the first powered segment, the second powered segment, and the unpowered segment via passive, all-optical connections, and wherein the first powered segment and the unpowered segment are connected via an optical connection that is not connected to the second powered segment, and wherein the branch unit includes an attenuator connected between the first and second powered segments.

12. The system of claim 11, wherein the unpowered segment is pumped with optical energy through the branch unit from at least one of the amplifiers in the first and second powered segments.

13. A method of transmitting optical communications signals, comprising:
    transmitting first and second optical communications signals from first terminal equipment along a first powered segment;
    amplifying each of the first and second signals at least one time in the first powered segment;
    attenuating the first signal after the first powered segment;
    directing the first signal to a second powered segment, wherein directing the first signal to the second powered segment includes not directing the first signal to the unpowered segment, and
    wherein directing the first signal to the second powered segment includes passively directing the first signal to the second powered segment;
    amplifying the first signal at least one time in the second powered segment;
    receiving the first signal at second terminal equipment;
    amplifying the second signal after the first powered segment;
    directing the second signal to an unpowered segment; and
    receiving the second signal at third terminal equipment.

14. The method of claim 13, wherein amplifying the second signal includes pumping at least one of a branch unit and the unpowered segment from an amplifier in at least one of the first and second powered segments.

15. The method of claim 13, wherein amplifying the second signal includes pumping the unpowered segment from the third terminal equipment.

16. The method of claim 13, wherein amplifying the second signal includes pumping the unpowered segment from a branching unit connecting the first powered segment, second powered segment, and unpowered segment.

17. The method of claim 13, further comprising fixing electrical ground at a branch unit between the first powered segment, second powered segment, and unpowered segment.

* * * * *